United States Patent
Gulati et al.

(10) Patent No.: US 9,532,301 B2
(45) Date of Patent: Dec. 27, 2016

(54) ON-DEMAND, REQUEST-RESPONSE BASED DISCOVERY IN PEER-TO-PEER NETWORKS

(71) Applicant: QUALCOMM Incorporated, San Diego, CA (US)

(72) Inventors: Kapil Gulati, Long Branch, NJ (US); Shailesh Patil, Bridgewater, NJ (US); Saurabha Rangrao Tavildar, Jersey City, NJ (US); Bilal Sadiq, Basking Ridge, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 180 days.

(21) Appl. No.: 14/038,735

(22) Filed: Sep. 26, 2013

(65) Prior Publication Data
US 2015/0085697 A1    Mar. 26, 2015

(51) Int. Cl.
| H04L 12/28 | (2006.01) |
| H04W 48/14 | (2009.01) |
| H04W 48/10 | (2009.01) |
| H04W 4/00  | (2009.01) |
| H04W 8/00  | (2009.01) |

(52) U.S. Cl.
CPC ............ *H04W 48/14* (2013.01); *H04W 4/008* (2013.01); *H04W 8/005* (2013.01); *H04W 48/10* (2013.01)

(58) Field of Classification Search
CPC ...... H04W 8/005; H04W 48/00; H04W 48/10; H04W 48/12; H04W 48/14; H04W 48/16; H04W 48/18
USPC .......................................... 370/254, 329–341
See application file for complete search history.

(56) References Cited

U.S. PATENT DOCUMENTS

| 8,077,801 | B2  | 12/2011 | Malladi |
| 8,325,697 | B2  | 12/2012 | Wu et al. |
| 8,416,810 | B2* | 4/2013  | Yoshii et al. .................. 370/478 |
| 2007/0237125 | A1* | 10/2007 | Ohuchi ......................... 370/338 |
| 2008/0298502 | A1* | 12/2008 | Xu ........................ H04L 5/0007 375/299 |
| 2010/0165882 | A1  | 7/2010  | Palanki et al. |
| 2011/0007720 | A1* | 1/2011  | Shimizu et al. .............. 370/336 |

(Continued)

FOREIGN PATENT DOCUMENTS

WO     2011026235 A1     3/2011

OTHER PUBLICATIONS

International Search Report and Written Opinion—PCT/US2014/056815—ISA/EPO—Jan. 23, 2015.

*Primary Examiner* — Kan Yuen
(74) *Attorney, Agent, or Firm* — Arent Fox LLP

(57) ABSTRACT

A method, an apparatus, and a computer program product for wireless communication are provided. In one configuration, the apparatus sends a transmission requesting a peer discovery signal and indicating whether the transmission includes a unicast request or a multicast request. In addition, the apparatus receives at least one peer discovery signal response based on the transmission. In another configuration, the apparatus receives a transmission requesting a peer discovery signal and indicating whether the transmission includes a unicast request or a multicast request. In addition, the apparatus sends a peer discovery signal response in response to the received transmission and on resources determined based on the indication whether the transmission includes a unicast request or a multicast request.

23 Claims, 11 Drawing Sheets

(56) References Cited

U.S. PATENT DOCUMENTS

| | | |
|---|---|---|
| 2011/0085455 A1 | 4/2011 | Wu et al. |
| 2011/0103264 A1* | 5/2011 | Wentink ........................ 370/255 |
| 2012/0011247 A1 | 1/2012 | Mallik et al. |
| 2012/0014244 A1 | 1/2012 | Kishigami et al. |
| 2013/0172036 A1 | 7/2013 | Miklos et al. |
| 2013/0294270 A1* | 11/2013 | Yang et al. ................... 370/252 |
| 2014/0143588 A1* | 5/2014 | Leinonen ............ G06F 11/0742 714/2 |
| 2014/0189774 A1* | 7/2014 | Goyal et al. .................. 725/146 |

* cited by examiner

ON-DEMAND, REQUEST-RESPONSE BASED DISCOVERY IN PEER-TO-PEER NETWORKS

BACKGROUND

Field

The present disclosure relates generally to communication systems, and more particularly, to on-demand, request-response based discovery in peer-to-peer (P2P) networks.

Background

Peer discovery is a central feature of P2P networks in which discovering peers in proximity is the end goal or is required as a precursor for direct P2P communications. Background discovery may be utilized in P2P networks in order to reduce power consumption and use of time-frequency resources. Background discovery is where peers broadcast their presence at a slow, periodic rate (e.g., once every 20 seconds) on a time-frequency resource, and listen for other peers in their proximity when not transmitting. Background discovery may be too inefficient, especially when a lower latency discovery is needed. Accordingly, methods and apparatuses are needed for a lower latency peer discovery.

SUMMARY

In an aspect of the disclosure, a method, a computer program product, and an apparatus are provided. The apparatus sends a transmission requesting a peer discovery signal and indicating whether the transmission includes a unicast request or a multicast request. The apparatus receives at least one peer discovery signal response based on the transmission.

In an aspect of the disclosure, a method, a computer program product, and an apparatus are provided. The apparatus receives a transmission requesting a peer discovery signal and indicating whether the transmission includes a unicast request or a multicast request. The apparatus sends a peer discovery signal response in response to the received transmission and on resources determined based on the indication whether the transmission includes a unicast request or a multicast request.

DETAILED DESCRIPTION

Figure 1:
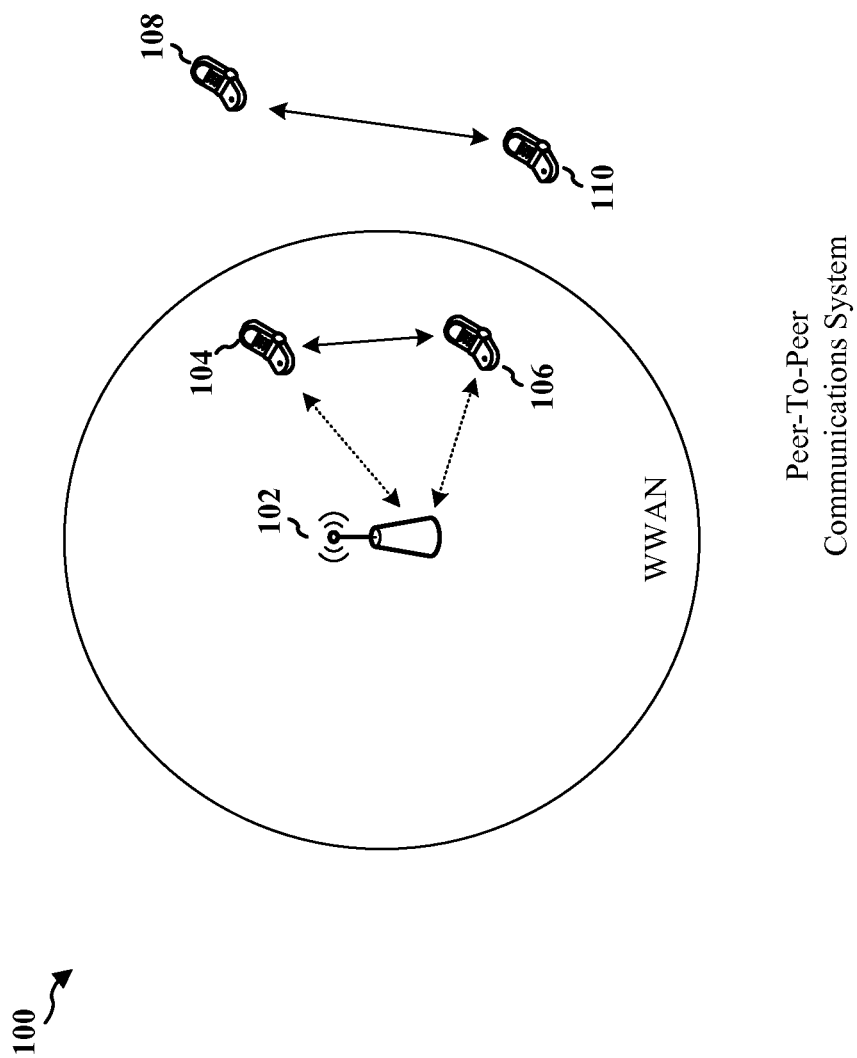
FIG. 1 is a diagram of a P2P communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatuses and methods. These apparatuses and methods will be described in the following detailed description and may be illustrated in the accompanying drawings by various blocks, modules, components, circuits, steps, processes, algorithms, elements, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The one or more processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram 100 of a P2P communications system. The P2P (also referred to as device-to-device (D2D)) communications system includes a plurality of wireless devices 104, 106, 108, 110. The P2P communications system may overlap with a cellular communications system, such as for example, a wireless wide area network (WWAN). Some of the wireless devices 104, 106, 108, 110 may communicate together in P2P communication using the DL/UL WWAN spectrum, some may communicate with the base station 102, and some may do both. For example, as shown in FIG. 1, the wireless devices 108, 110 are in P2P communication and the wireless devices 104, 106 are in P2P communication. The wireless devices 104, 106 may also communicate with the base station 102.

The base station 102 may also be referred to as a Node B, an evolved Node B (eNB), an access point, a base transceiver station, a radio base station, a radio transceiver, a transceiver function, a basic service set (BSS), an extended service set (ESS), or some other suitable terminology. Examples of wireless devices include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The wireless device may also be referred to by those skilled in the art as a user equipment (UE), mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The exemplary methods and apparatuses discussed infra are applicable to any of a variety of wireless P2P communications systems, such as for example, a wireless P2P communication system based on FlashLinQ, WiMedia, Bluetooth, ZigBee, Wi-Fi based on the IEEE 802.11 standard, or Long Term Evolution (LTE). However, one of ordinary skill in the art would understand that the exemplary methods and apparatuses are applicable more generally to a variety of other wireless P2P communication systems.

As discussed supra, background discovery may be utilized in P2P networks in order to reduce power consumption and use of time-frequency resources. However, background discovery may be inefficient for some use cases that require a lower latency peer discovery. On-demand discovery provides a lower latency peer discovery. In on-demand discovery, UEs announce their discovery information in response to a query for the discovery information. For example, a UE may query for stores that have item X in stock. Stores that have item X in stock may respond to the query by transmitting their discovery information. Based on the received discovery information, the UE determines the stores that have item X in stock. The UE makes this determination far faster than the UE could make such determination using background discovery. Methods and apparatuses are provided infra in relation to on-demand discovery.

Figure 2:
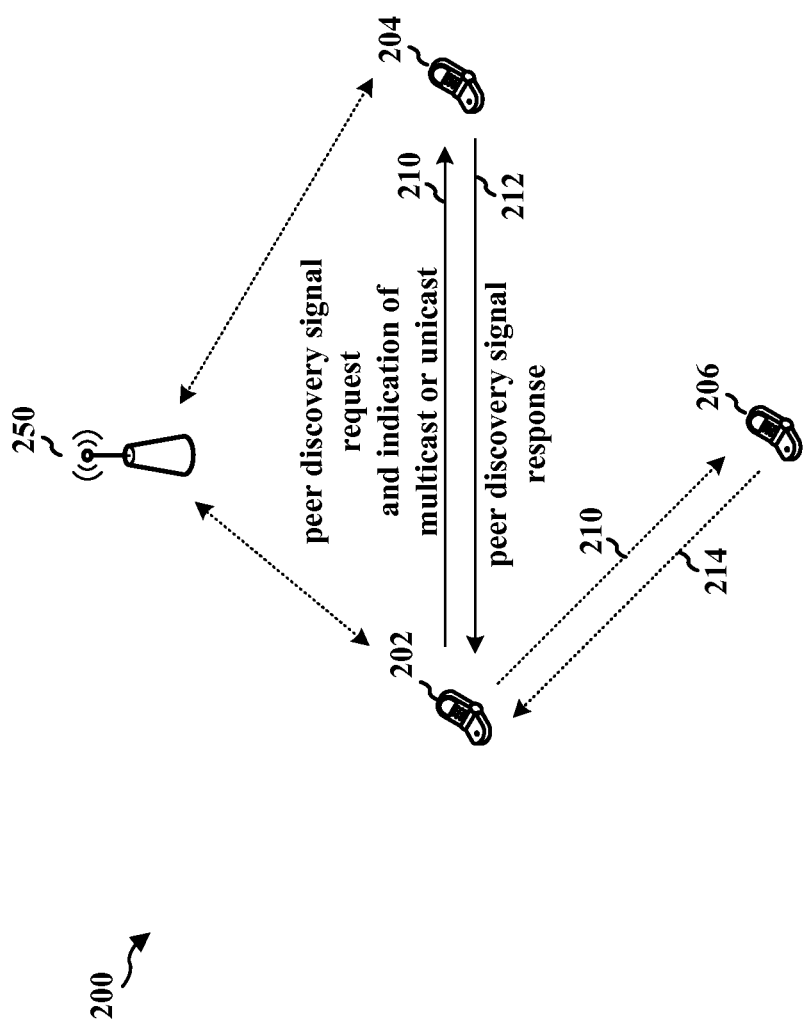
FIG. 2 is a first diagram illustrating a method of on-demand based peer discovery.

FIG. 2 is a first diagram 200 illustrating a method (or media access control (MAC)) of on-demand based peer discovery. As shown in FIG. 2, a UE 202 sends a transmission 210 requesting a peer discovery signal. The transmission 210 indicates whether the transmission 210 includes a unicast request or a multicast request. A unicast request is a request meant for a particular UE whose identification is known, such as through background discovery, offline information, or other means. Unicast requests may include information that indicate that the request is for a particular UE and/or may be transmitted on particular time-frequency resources dedicated to the particular UE. A multicast request is a request meant for a group of UEs or all UEs. The number of UEs that may respond (also referred to as fanout) to a multicast request may not be known by the UE transmitting the peer discovery signal request. The UE 204 receives the transmission 210 requesting a peer discovery signal. If the transmission 210 is a unicast request for the UE 204 or a multicast request, the UE 204 may respond by sending a peer discovery signal response 212 in response to the received transmission 210. The UE 204 may determine resources for transmitting the peer discovery signal response 212 based on the indication whether the transmission 210 includes a unicast request or a multicast request. The UE 204 transmits the peer discovery signal response 212 on the determined resources. If the UE 206 is in close enough proximity to the UE 202, the UE 206 may also receive the transmission 210. If the transmission 210 is a multicast request, the UE 206 may also respond to the transmission 210 by transmitting a peer discovery signal response. Accordingly, the UE 202 may receive at least one peer discovery signal response 212, 214 based on the transmission 210.

Some of the UEs may be in communication with a base station 250. For example, as shown in FIG. 2, the UE 202 and the UE 204 are in communication with the base station 250. The UEs 202, 204 may provide feedback to the base station 250 regarding on-demand discovery resource usage and may receive information from the base station 250 regarding available/allocated on-demand resources for on-demand discovery.

Figure 3:
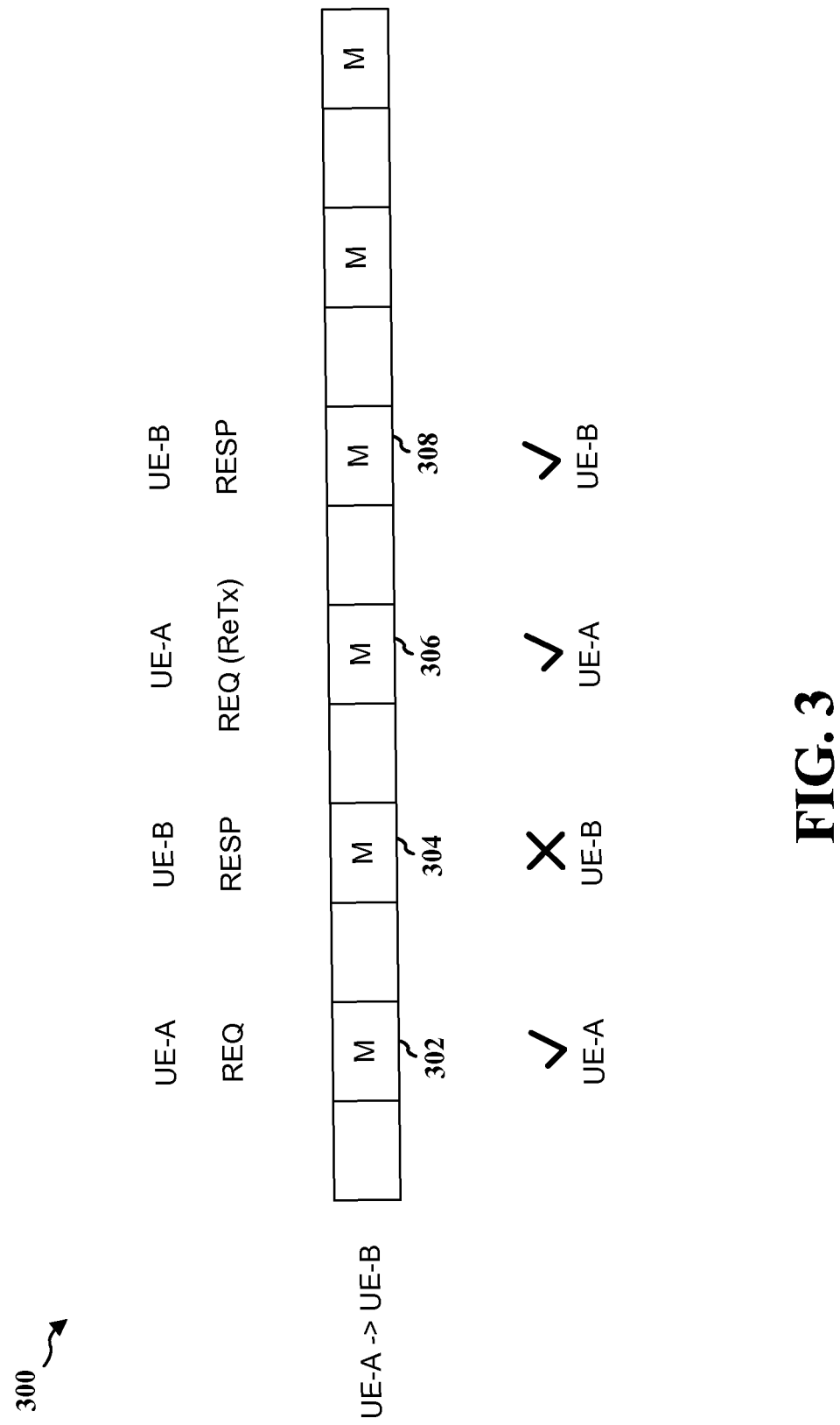
FIG. 3 is a second diagram illustrating a method of on-demand based peer discovery.

FIG. 3 is a second diagram 300 illustrating a method of on-demand based peer discovery. As shown in FIG. 3, the time slots available for sending requests for peer discovery signals and receiving peer discovery signal responses (i.e., used for peer discovery) are indicated with an M and time slots unavailable for sending requests for peer discovery signals and receiving peer discovery signal responses (i.e., not used for peer discovery) have no indication. In one configuration, the on-demand peer discovery discussed in relation to FIG. 2 occurs in interleaved time slots that are available for peer discovery signal requests and peer discovery signal responses (indicated with an M) such that peer discovery signal responses are transmitted in a next available time slot after the time slot in which a peer discovery signal request was received. Referring to FIG. 3, the UE-A transmits a peer discovery signal request in a first time slot 302. Assume the peer discovery signal request is a unicast request for the UE-B. If the UE-B successfully receives and decodes the peer discovery signal request, the UE-B transmits a peer discovery signal response in a second time slot 304. The second time slot 304 is a next available time slot after the first time slot 302 for sending requests for peer discovery signals and receiving peer discovery signal responses. However, as shown in FIG. 3, the UE-B does not successfully receive and decode the peer discovery signal request in the first time slot 302 and therefore does not transmit a peer discovery signal response in the second time slot 304. Because the UE-A does not receive a peer discovery signal response from the UE-B in the second time slot 304, the UE-A again transmits a peer discovery signal request in a third time slot 306. The UE-B successfully receives and decodes the peer discovery signal request received in the third time slot 306 and transmits a peer discovery signal response in a fourth time slot 308. Because UEs transmit peer discovery signal responses in a next available time slot after receiving a peer discovery signal request, UEs transmitting a peer discovery signal request may determine when a unicast peer discovery signal request is not received properly and may retransmit such unicast peer discovery signal request.

Figure 4:
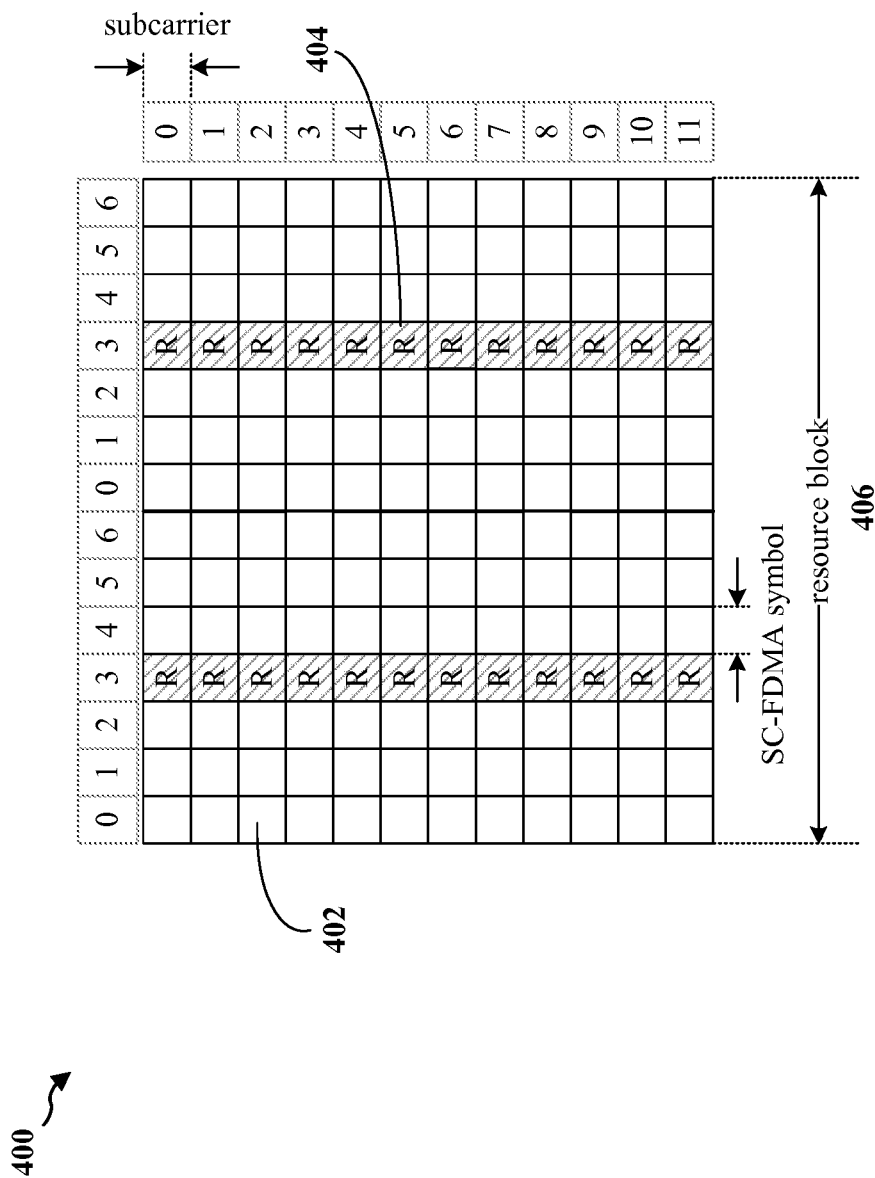
FIG. 4 is a third diagram illustrating a method of on-demand based peer discovery.

FIG. 4 is a third diagram 400 illustrating a method of on-demand based peer discovery. In one configuration, UEs indicate whether a peer discovery signal request is a unicast request or a multicast request by transmitting the peer discovery signal request with a particular orthogonal pilot sequence. UEs may select a pilot sequence from a first set of orthogonal pilot sequences $P_1$ when the request is a unicast request and may select a pilot sequence from a second set of orthogonal pilot sequences $P_2$ when the request is a multicast request. The first and second sets of orthogonal sequences may have no pilot sequences in common (i.e., $P_1 \cap P_2 = \emptyset$), and the first and second sets of pilot sequences may be subsets of a set of orthogonal pilot sequences P (i.e., $P_1$, $P_2 \subset P$) that are all orthogonal to each other. UEs may transmit peer discovery signal requests within a resource block 406. The resource block 406 may include a plurality of resource elements, each at a particular symbol (e.g., single carrier frequency division multiple access (SC-FDMA) symbol) and a subcarrier. Some of the resource elements 402 include data/control information of the peer discovery signal request and some of the resource elements 404 include reference/pilot signals. UEs may transmit the selected pilot sequence within the resource elements 404 within a resource block 406 including the peer discovery signal request. So that UEs may distinguish between unicast peer discovery signal requests and peer discovery signal responses, UEs may transmit all peer discovery signal responses with a pilot sequence selected from the second set of orthogonal pilot sequences $P_2$. As such, UEs may transmit unicast peer discovery signal requests with a pilot sequence selected from the first set of orthogonal pilot sequences $P_1$, and may transmit multicast peer discovery signal requests and unicast/multicast peer discovery signal responses with a pilot sequence selected from the second set of orthogonal pilot sequences $P_2$. UEs may still utilize the received pilot sequence for channel estimation and decoding. The pilot sequences are detectable by all UEs, even if the data/control information are protected. Thus, UEs can determine whether a pilot sequence received in a resource block 406 is associated or unassociated with a unicast request. Use of pilot sequences to indicate whether a transmission is a unicast request ensures that channel estimation and decoding is unaffected.

Figure 5:
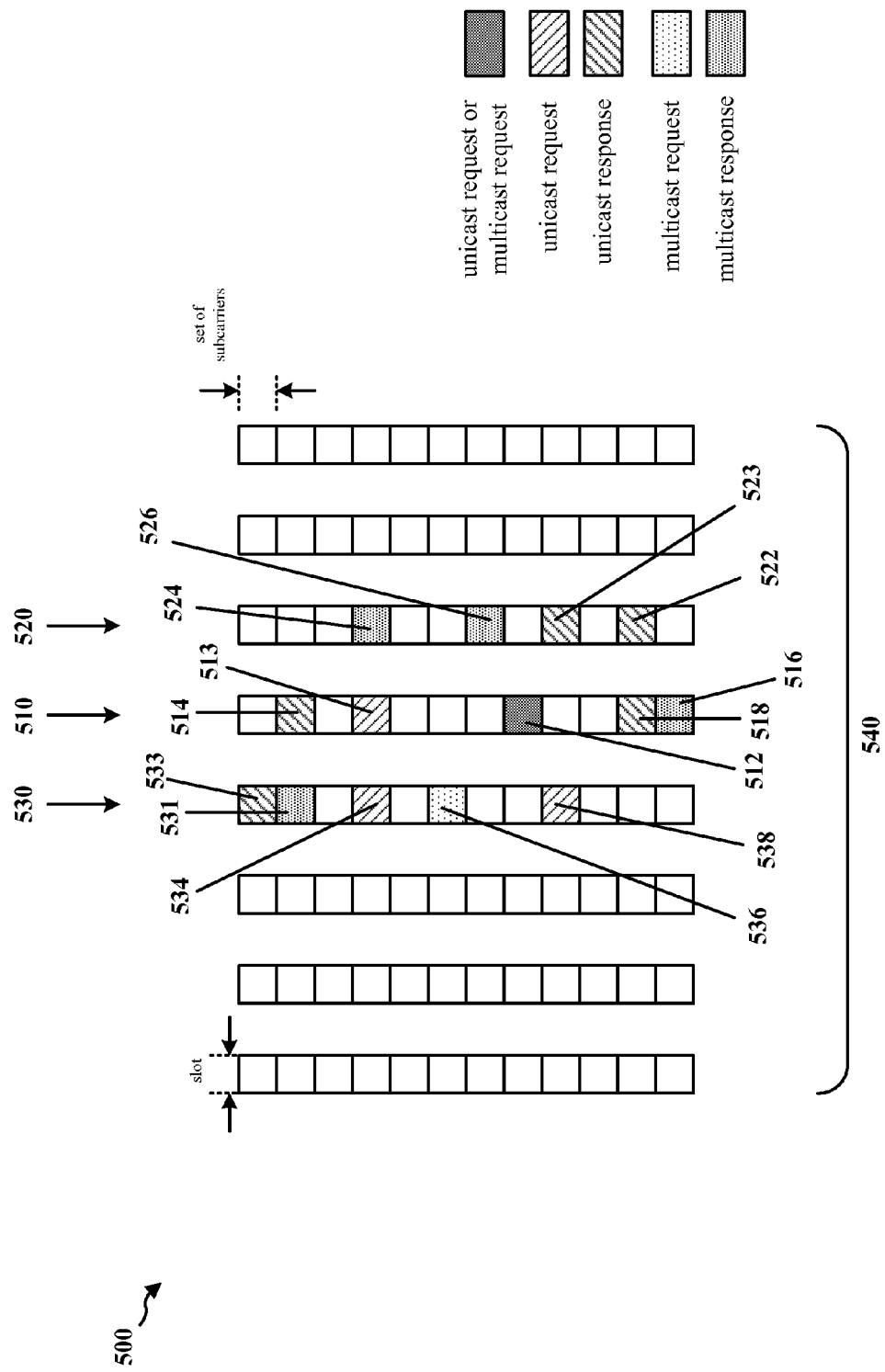
FIG. 5 is a fourth diagram illustrating a method of on-demand based peer discovery.

FIG. 5 is a fourth diagram 500 illustrating a method of on-demand based peer discovery. In a first configuration, resources for unicast peer discovery signal responses may be linked one-to-one with resources on which unicast peer discovery signal requests are sent/received. Accordingly, the unicast peer discovery signal response resource $R_{uresp}$ is a function of the unicast peer discovery signal request resource $R_{ureq}$ (i.e., $R_{uresp}=f(R_{ureq})$). When the unicast peer discovery signal response resource $R_{uresp}$ is a function of the unicast peer discovery signal request resource $R_{ureq}$, the unicast peer discovery signal responses are protected from colliding among themselves. Collisions (same resources being used) are avoided because a unique unicast peer discovery signal response resource $R_{uresp}$ is provided for responding to each received unicast peer discovery signal request. In a second configuration, UEs listen on all time-frequency resources and determine resources with ongoing unicast requests. In a third configuration, for unicast request, multicast request, and multicast response transmissions (non-unicast response transmissions), UEs select resources for the transmissions that avoid the resources on which a unicast response is expected. Such configurations protect unicast response transmissions from colliding with other transmissions when possible.

Referring to FIG. 5, with respect to the first configuration, a UE 202 determines a set of resources 540 for sending requests for peer discovery signals and receiving peer discovery signal responses. The UE 202 sends a peer discovery signal request 210 in a time slot 510 of the set of resources 540 and receives at least one peer discovery signal response 212, 214 in a time slot 520 of the set of resources 540. The time slot 520 is a next available time slot after the time slot 510 for sending requests for peer discovery signals and receiving peer discovery signal responses. For example, if the UE 202 sends a unicast peer discovery signal request 210 in the resource 512 to the UE 204, the UE 202 may receive a unicast peer discovery signal response 212 in the resource 522 from the UE 204. For another example, if the UE 202 sends a multicast peer discovery signal request 210 in the resource 512, the UE 202 may receive a multicast peer discovery signal response 212 in the resource 524 from the UE 204 and may receive a multicast peer discovery signal response 214 in the resource 526 from the UE 206. When the UE 202 sends a unicast peer discovery signal request 210, the UE 202 determines a subset of resources 522 of the set of resources 540 in the time slot 520 for receiving the unicast peer discovery signal response 212. As discussed supra, the subset of resources 522 ($R_{uresp}$) is determined based on a mapping known a priori from resources 512 ($R_{ureq}$) utilized for sending the peer discovery signal request 210.

With respect to the second configuration, the UE 202 may listen for transmissions in a time slot 530 of the set of resources 540. The time slot 530 is a time slot previously available to the time slot 510 that is available for sending requests for peer discovery signals and receiving peer discovery signal responses. The UE 202 determines transmissions received in the time slot 530 that are unicast requests, and determines a subset of resources in the time slot 530 corresponding to the determined transmissions that are utilized for unicast requests. For example, the UE 202 may determine that the transmissions received in the resources 534, 538 are unicast requests, while the transmissions received in the resources 536, 533, 531 are not unicast requests (i.e., that the transmissions received in the resources 536, 533, 531 are unicast responses, multicast requests, and/or multicast responses). Based on the resources 534, 538 carrying unicast requests in the time slot 530, the UE 202 may determine a resource for sending a peer discovery signal request 210 within the time slot 510.

With respect to the third configuration, the UE 202 may determine a second subset of resources 514, 518 in the time slot 510 based on mappings known a priori from the subset of resources 534, 538 in the time slot 530 to the second subset of resources 514, 518 in the time slot 510. The resource 514 is dedicated for a unicast peer discovery signal response in response to the unicast peer discovery signal request on the resource 534. Similarly, the resource 518 is dedicated for a unicast peer discovery signal response in response to the unicast peer discovery signal request on the resource 538. The UE 202 determines a third subset of resources in the time slot 510 of the set of resources 540 that exclude all resources within the second subset of resources 514, 518. The third subset of resources includes all of the resources in the time slot 510 excluding the second subset of resources 514, 518. Accordingly, the third subset of resources in the time slot 510 includes resources on which unicast peer discovery signal responses are not expected (resources in the third subset of resources may be unutilized or may be utilized for unicast peer discovery signal requests, multicast peer discovery signal requests, or multicast peer discovery signal responses). The UE 202 then selects randomly a fourth subset of resources 512 from the third subset of resources for sending the peer discovery signal request 210. As the UE 202 selects a resource randomly for the peer discovery signal request 210, the UE may select the resource 513 on which a unicast request is sent (by another UE) or the resource 516 on which a multicast response is sent (by another UE), but not the resources 514, 518 excluded from selection. Accordingly, this configuration may protect only unicast response transmissions from colliding with other transmissions, and may not protect other transmissions, such as unicast request transmissions, multicast request transmissions, and multicast response transmissions.

Alternatively, rather than avoid resources on which unicast responses are expected, the UE 202 may select randomly a subset of resources of the set of resources 540 in the time slot 510 for sending the peer discovery signal request 210. For example, rather than select randomly a resource from the resources in the time slot 510 excluding the resources 514, 518, the UE 202 may select randomly a resource in the time slot 510 from all of the resources in the time slot 510. In this configuration, the UE 202 may end up selecting one of the resources 514 or 518, thus resulting in a collision (same resource being used) by two different UEs. However, such a collision may not be so detrimental to UEs utilizing (transmitting or receiving on) the colliding resource if the UEs are sufficiently far apart from each other.

Referring again to FIG. 5, with respect to the first configuration, the UE 204 determines a set of resources 540 for receiving requests for peer discovery signals and sending peer discovery signal responses. The UE 204 receives a peer discovery signal request 210 in a time slot 510 of the set of resources 540 and sends a peer discovery signal response 212 in a time slot 520 of the set of resources 540. The time slot 520 is a next available time slot after the time slot 510 for receiving requests for peer discovery signals and sending peer discovery signal responses. For example, if the UE 204 receives a unicast peer discovery signal request 210 in the resource 512 from the UE 202, the UE 204 may send a unicast peer discovery signal response 212 in the resource 522 to the UE 202. For another example, if the UE 204 receives a multicast peer discovery signal request 210 in the resource 512, the UE 204 may send a multicast peer discovery signal response 212 in the resource 524 to the UE 202. Assume the UE 204 receives a peer discovery signal request 210 in a first subset of resources 512 of the set of resources 540 in the time slot 510. The UE 204 determines whether the received peer discovery signal request 210 in the resource 512 indicates the peer discovery signal request 210 is a unicast request or a multicast request. When the UE 204 determines that the received peer discovery signal request 210 is a unicast request, the UE 204 determines a second subset of resources 522 of the set of resources 540 in the time slot 520 for sending the peer discovery signal response. As discussed supra, the second subset of resources 522 ($R_{uresp}$) is determined based on a mapping known a priori from the first subset of resources 512 ($R_{ureq}$) to the second subset of resources 522 ($R_{uresp}$).

With respect to the second configuration, the UE 204 may listen for transmissions in the time slot 510 of the set of resources 540. The UE 204 determines transmissions received in the time slot 510 that are unicast requests, and determines a subset of resources in the time slot 510 corresponding to the determined transmissions that are utilized for unicast requests. For example, the UE 204 may determine that the transmission received in the resource 513 is a unicast request. Based on the resource 513 carrying a unicast request in the time slot 510, the UE 204 may determine a resource for sending a multicast peer discovery signal response within the time slot 520.

With respect to the third configuration, the UE 204 determines a second subset of resources 523 ($R_{uresp}$) in the time slot 520 based on mappings known a priori from the subset of resources 513 ($R_{ureq}$) in the time slot 510 to the second subset of resources 523 ($R_{uresp}$) in the time slot 520. That is, the UE 204 may determine that the resource 523 is linked to the resource 513 and is dedicated for a peer discovery signal response in response to the peer discovery signal request in the resource 513. The UE 204 determines a third subset of resources in the time slot 520 of the set of resources 540 that exclude all resources in the second subset of resources 523. The third subset of resources includes all of the resources in the time slot 520 excluding the second subset of resources 523. Accordingly, the third subset of resources in the time slot 520 includes resources on which unicast peer discovery signal responses are not received (resources in the third subset of resources may be unutilized or may be utilized for unicast peer discovery signal requests, multicast peer discovery signal requests, or multicast peer discovery signal responses). When sending a multicast peer discovery signal response, the UE 204 selects randomly a fourth subset of resources 524 from the third subset of resources for sending the peer discovery signal response 212. As the UE 204 selects a resource randomly for the peer discovery signal response 212, the UE 204 may select the resource 526 on which a multicast response is sent (by the UE 206), but not the resource 523 that was excluded from selection. Accordingly, this configuration may protect only unicast response transmissions from colliding with other transmissions, and may not protect other transmissions, such as unicast request transmissions, multicast request transmissions, and multicast response transmissions.

Alternatively, rather than avoid resources on which unicast responses are expected, the UE 204 may select randomly a subset of resources of the set of resources 540 in the time slot 520 for sending the peer discovery signal response 212 when the peer discovery signal response 212 is a multicast response. For example, rather than select randomly a resource from the resources in the time slot 520 excluding the resource 523, the UE 204 may select randomly a resource in the time slot 520 from all of the resources in the time slot 520. In this configuration, the UE 204 may end up selecting the resources 523, thus resulting in a collision (same resource being used) by two different UEs. However, such a collision may not be so detrimental to UEs utilizing (transmitting or receiving on) the colliding resource if the UEs are sufficiently far apart from each other.

Referring again to FIG. 2, the UEs 202, 204 may provide feedback to the base station 250 regarding an average number of resources in the set of resources 540 with on-going transmissions (e.g., by detecting power on the resources), an average number of resources in the set of resources 540 with on-going unicast requests, and/or an average number of resources in the set of resources 540 utilized for responses to multicast requests (e.g., number of resources in which unique responses are received by multicast request originators (for estimating fanout)). The UEs 202, 204 may provide the feedback at a slow rate (e.g., hundreds of on-demand discovery cycles). With the received information, the base station 250 estimates a number of unicast and multicast requests and responses in the system (system load), and may increase/decrease the number of on-demand discovery resources as required. The base station 250 may transmit the change in allocation (an indication of the set of resources 540) as part of a system information block (SIB).

Figure 6:
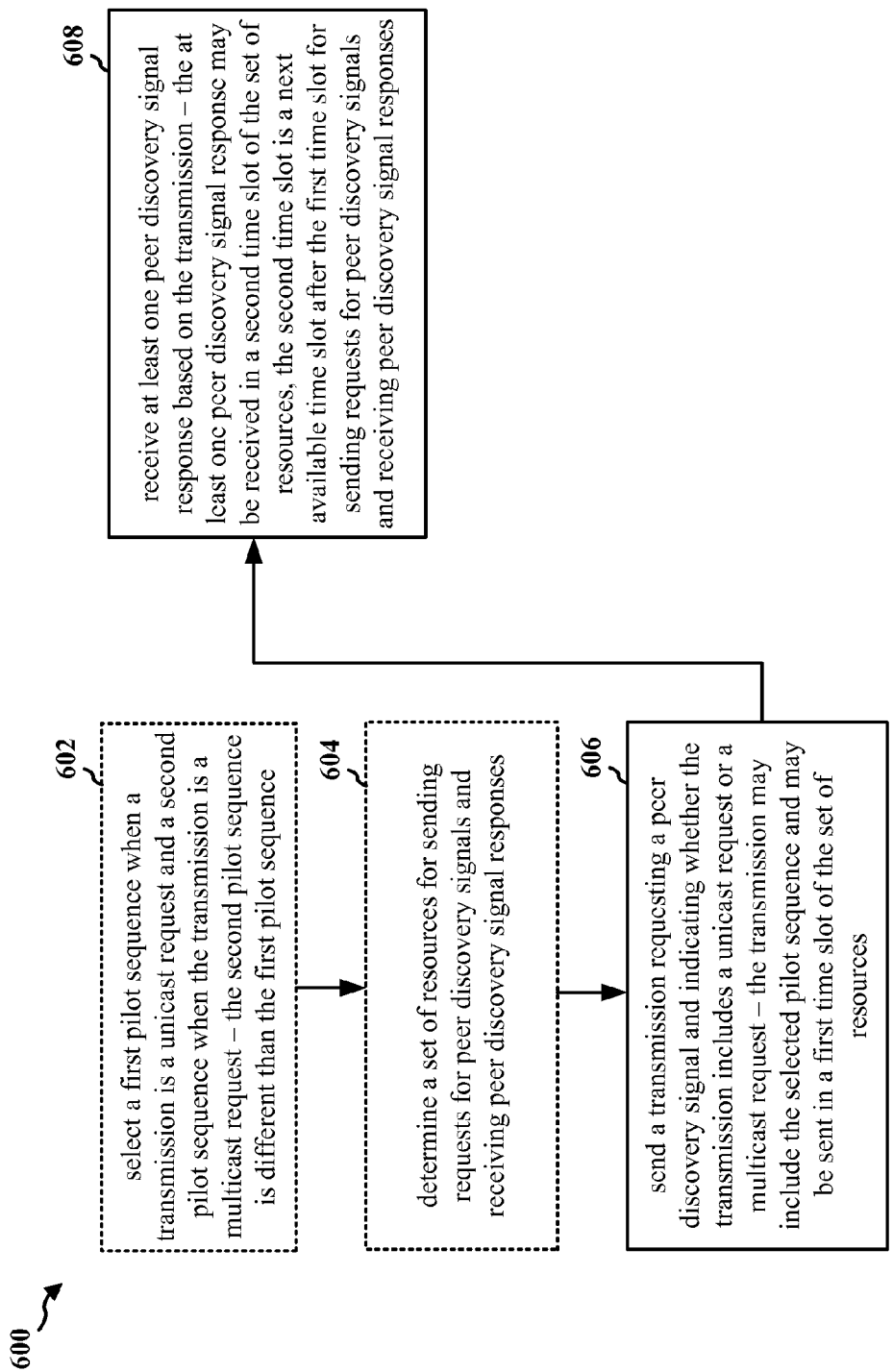
FIG. 6 is a flow chart of a first method of wireless communication.

FIG. 6 is a flow chart 600 of a first method of wireless communication. The method may be performed by a UE, such as the UE 202. In step 602, the UE may select a first pilot sequence when a transmission is a unicast request and may select a second pilot sequence when the transmission is a multicast request. The second pilot sequence is different than the first pilot sequence. Specifically, in step 602, the UE may select one or more pilot sequences from a first subset of pilot sequences $P_1$ of a set of orthogonal pilot sequences P when the transmission is a unicast request, and may select one or more pilot sequences from a second subset of pilot sequences $P_2$ of the set of orthogonal pilot sequences P when the transmission is a multicast request. The second subset of pilot sequences $P_2$ is different than the first subset of pilot sequences $P_1$ (i.e., $P_1 \cap P_2 = \emptyset$). In step 604, the UE may determine a set of resources 540 for sending requests for peer discovery signals and receiving peer discovery signal responses. The UE may receive information from a base station indicating the set of resources 540. In such a configuration, the UE may send information to the base station indicating at least one of an average number of resources in the set of resources 540 with transmissions, an average number of resources in the set of resources 540 utilized for unicast requests, or an average number of resources in the set of resources 540 utilized for responses to multicast requests. The information that the UE receives from the base station is based on the information sent to the base station. In step 606, the UE sends a transmission 210 requesting a peer discovery signal and indicating whether the transmission includes a unicast request or a multicast request. The transmission may include the selected pilot sequence and may be sent in a time slot 510 of the set of resources 540. In step 608, the UE receives at least one peer discovery signal response 212, 214 based on the transmission. The at least one peer discovery signal response 212, 214 may be received in a time slot 520 of the set of resources 540. The time slot 520 is a next available time slot after the time slot 510 for sending requests for peer discovery signals and receiving peer discovery signal responses. In step 608, the UE may receive the at least one peer discovery signal response 212, 214 concurrently with one or more pilot sequences from the second subset of pilot sequences $P_2$. As described supra, only unicast peer discovery signal requests may include a pilot sequence from the first subset of pilot sequences $P_1$. Unicast peer discovery signal responses, multicast peer discovery signal requests, and multicast peer discovery signal responses may include a pilot sequence from the second subset of pilot sequences $P_2$. Accordingly, the at least one peer discovery signal response 212, 214 may include pilot sequences from the second subset of pilot sequences $P_2$.

Figure 7:
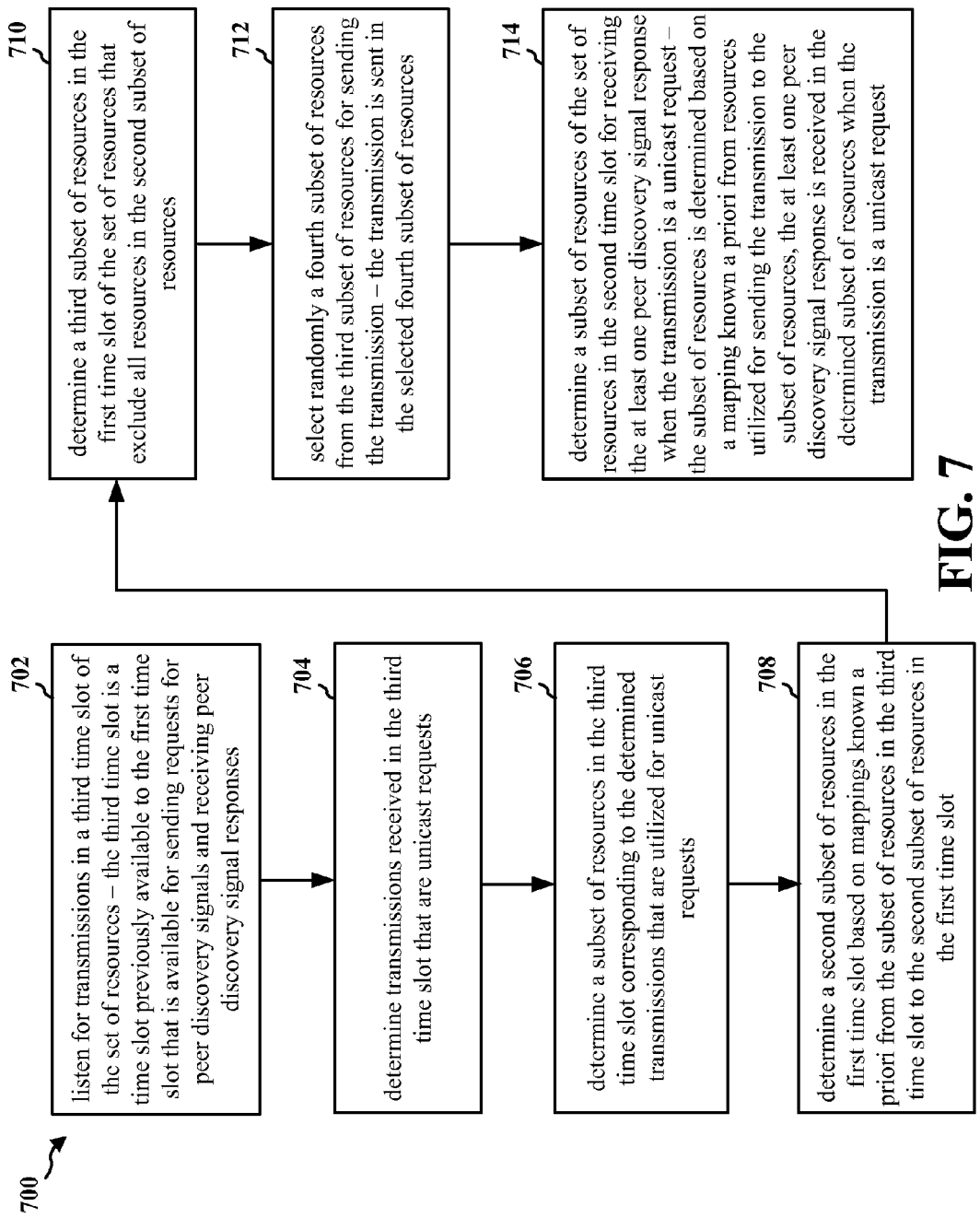
FIG. 7 is a flow chart of a second method of wireless communication.

FIG. 7 is a flow chart 700 of a second method of wireless communication. The method may be performed by a UE, such as the UE 202. In step 702, the UE listens for transmissions in a time slot 530 of the set of resources 540. The time slot 530 is a time slot previously available to the time slot 510 that is available for sending requests for peer discovery signals and receiving peer discovery signal responses. In step 704, the UE determines transmissions received in the time slot 530 that are unicast requests. In step 706, the UE determines a subset of resources in the time slot 530 corresponding to the determined transmissions that are utilized for unicast requests. For example, referring to FIG. 5, the UE may determine that the resources 534, 538 in the time slot 530 are utilized for unicast requests. In step 708, the UE determines a second subset of resources in the time slot 510 based on mappings known a priori from the subset of resources in the time slot 530 to the second subset of resources in the time slot 510. For example, referring to FIG. 5, the UE may determine that the resources 514, 518 are linked with and map from the resources 534, 538, respectively. In step 710, the UE determines a third subset of resources in the time slot 510 of the set of resources 540 that exclude all resources in the second subset of resources. For example, referring to FIG. 5, the UE may determine that the third subset of resources includes all the resources in the time slot 510 excluding the resources 514, 518. In step 712, the UE selects randomly a fourth subset of resources from the third subset of resources for sending the transmission. The transmission is sent (see step 606 of FIG. 6) in the selected fourth subset of resources. For example, from the third subset of resources, the UE may select the resource 512 randomly. The fourth subset of resources is therefore the resource 512. The UE avoids selecting the resources 514, 518, as those resources were excluded from the third subset of resources from which the fourth subset of resources was selected randomly. In step 714, the UE determines a subset of resources of the set of resources 540 in the time slot 520 for receiving the at least one peer discovery signal response when the transmission is a unicast request. The subset of resources is determined based on a mapping known a priori from resources utilized for sending the transmission. The at least one peer discovery signal response is received in the determined subset of resources when the transmission is a unicast request. For example, referring to FIG. 5, the resource 522 of the time slot 520 is linked with and is mapped from the resource 512 of the time slot 510 when the resource 512 carries a unicast request. Accordingly, if the resource 512 is utilized for a unicast peer discovery signal request, then the UE will determine that a unicast peer discovery signal response in response to the unicast peer discovery signal request may be received in the resource 522.

In one configuration, the UE may not perform the steps 702-712. Instead, the UE may select randomly a subset of resources of the set of resources 540 in the time slot 510 for sending the transmission. That is, the UE may select randomly any of the resources in the time slot 510 for sending the transmission. In this configuration, the UE may select randomly one of the resources 514, 518, which would then collide with the unicast responses on those resources. Such a collision may not be so detrimental to the UEs utilizing the colliding resources if the UEs are sufficiently far apart from each other.

Figure 8:
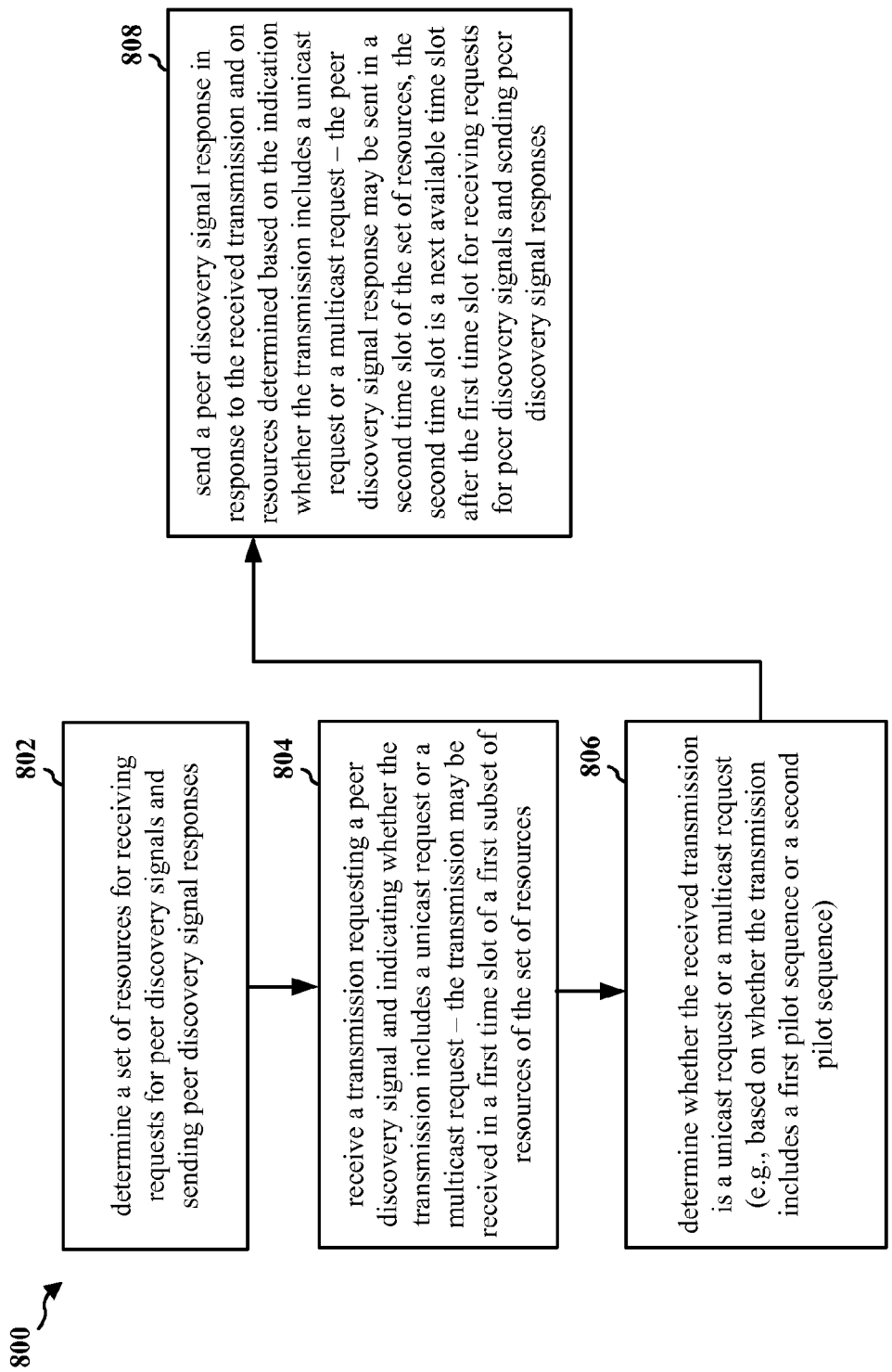
FIG. 8 is a flow chart of a third method of wireless communication.

FIG. 8 is a flow chart 800 of a third method of wireless communication. The method may be performed by a UE, such as the UE 204. In step 802, the UE determines a set of resources 540 for receiving requests for peer discovery signals and sending peer discovery signal responses. The UE may receive information from a base station indicating the set of resources 540. The UE may send information to the base station indicating at least one of an average number of resources in the set of resources 540 with transmissions, an average number of resources in the set of resources 540 utilized for unicast requests, or an average number of resources in the set of resources 540 utilized for responses to multicast requests. The information received from the base station may be based on the information sent to the base station. In step 804, the UE receives a transmission 210 requesting a peer discovery signal and indicating whether the transmission 210 includes a unicast request or a multicast request. The transmission 210 is received in a time slot 510 of the set of resources 540. In particular, the transmission is received in a first subset of resources of the set of resources 540 in the time slot 510. For example, referring to FIG. 5, the first subset of resources is the resource 512. In step 806, the UE determines whether the received transmission 210 is a unicast request or a multicast request. The UE may determine whether the received transmission 210 is a unicast request or a multicast request based on whether the transmission 210 includes the first pilot sequence or the second pilot sequence. The transmission 210 may include a first pilot sequence when the transmission 210 is a unicast request, and a second pilot sequence when the transmission 210 is a multicast request. The second pilot sequence is different than the first pilot sequence. Specifically, the transmission 210 may include one or more pilot sequences from a first subset of pilot sequences $P_1$ of a set of orthogonal pilot sequences P when the transmission 210 is a unicast request, and one or more pilot sequences from a second subset of pilot sequences $P_2$ of the set of orthogonal pilot sequences P when the transmission 210 is a multicast request. The second subset of pilot sequences $P_2$ is different than the first subset of pilot sequences $P_1$ (i.e., $P_1 \cap P_2 = \emptyset$). The UE may determine whether the received transmission 210 is a unicast request or a multicast request based on whether the transmission 210 includes one or more pilot sequences from the first subset of pilot sequences $P_1$ or the second subset of pilot sequences $P_2$. In step 808, the UE sends a peer discovery signal response 212 in response to the received transmission 210 and on resources determined based on the indication whether the transmission 210 includes a unicast request or a multicast request. The peer discovery signal response 212 is sent in a time slot 520 of the set of resources 540. The time slot 520 is a next available time slot after the time slot 510 for receiving requests for peer discovery signals and sending peer discovery signal responses.

In step 808, the UE may send the peer discovery signal response 212 concurrently with one or more pilot sequences from the second subset of pilot sequences $P_2$. As described supra, only unicast peer discovery signal requests may include a pilot sequence from the first subset of pilot sequences $P_1$. Unicast peer discovery signal responses, multicast peer discovery signal requests, and multicast peer discovery signal responses may include a pilot sequence from the second subset of pilot sequences $P_2$. Accordingly, the peer discovery signal response 212 may include one or more pilot sequences from the second subset of pilot sequences $P_2$.

Figure 9:
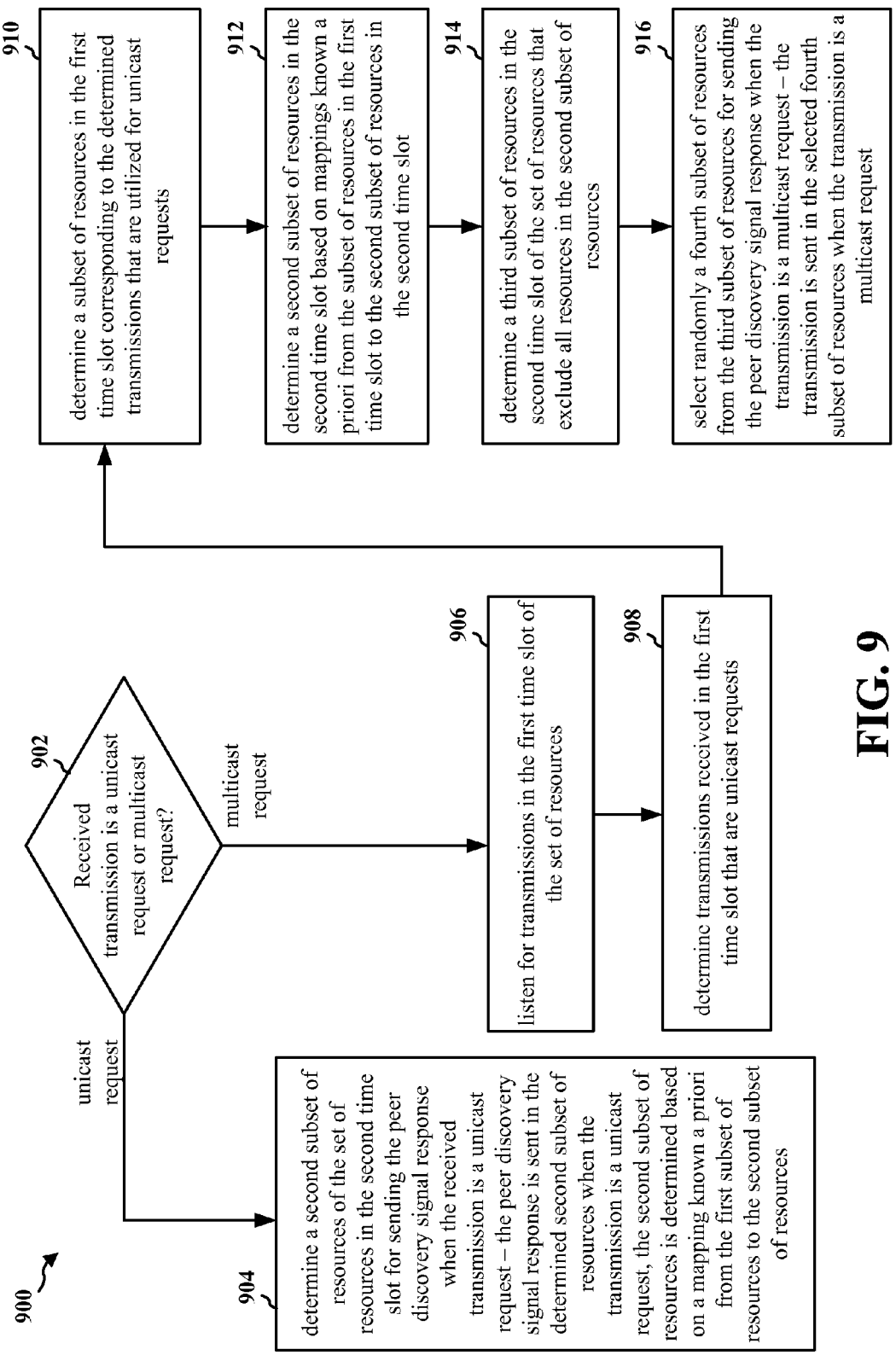
FIG. 9 is a flow chart of a fourth method of wireless communication.

FIG. 9 is a flow chart 900 of a fourth method of wireless communication. The method may be performed by a UE, such as the UE 204. In step 902, the UE determines whether the received transmission indicates the transmission is a unicast request or a multicast request based on the indication in the received transmission. If the transmission is a unicast request, in step 904, the UE determines a second subset of resources 540 in the time slot 520 for sending the peer discovery signal response. The peer discovery signal response is sent in the determined second subset of resources 522 when the transmission is a unicast request. The second subset of resources 522 is determined based on a mapping known a priori from the first subset of resources 512 to the second subset of resources 522. If the transmission is a multicast request, in step 906, the UE listens for transmissions in the time slot 510 of the set of resources 540. In step 908, the UE determines transmissions received in the time slot 510 that are unicast requests. In step 910, the UE determines a subset of resources 513 in the time slot 510 corresponding to the determined transmissions that are utilized for unicast requests. In step 912, the UE determines a second subset of resources 523 in the time slot 520 based on mappings known a priori from the subset of resources 513 in the time slot 510 to the second subset of resources 523 in the time slot 520. In step 914, the UE determines a third subset of resources in the time slot 520 of the set of resources 540 that exclude all resources in the second subset of resources 523. In step 916, the UE selects randomly a fourth subset of resources from the third subset of resources for sending the peer discovery signal response. For example, as shown in FIG. 5, the UE selects randomly the resource 524 for sending the peer discovery signal response. The transmission is sent in the selected fourth subset of resources when the transmission is a multicast request.

In one configuration, the UE may not perform the steps 906-916. Instead, the UE may select randomly a subset of resources of the set of resources 540 in the time slot 520 for sending the peer discovery signal response. That is, the UE may select randomly any of the resources in the time slot 520 for sending the multicast response. In this configuration, the UE may select randomly the resource 523, which would then collide with the unicast response on that resource. Such a collision may not be so detrimental to the UEs utilizing the colliding resource if the UEs are sufficiently far apart from each other.

Figure 10:
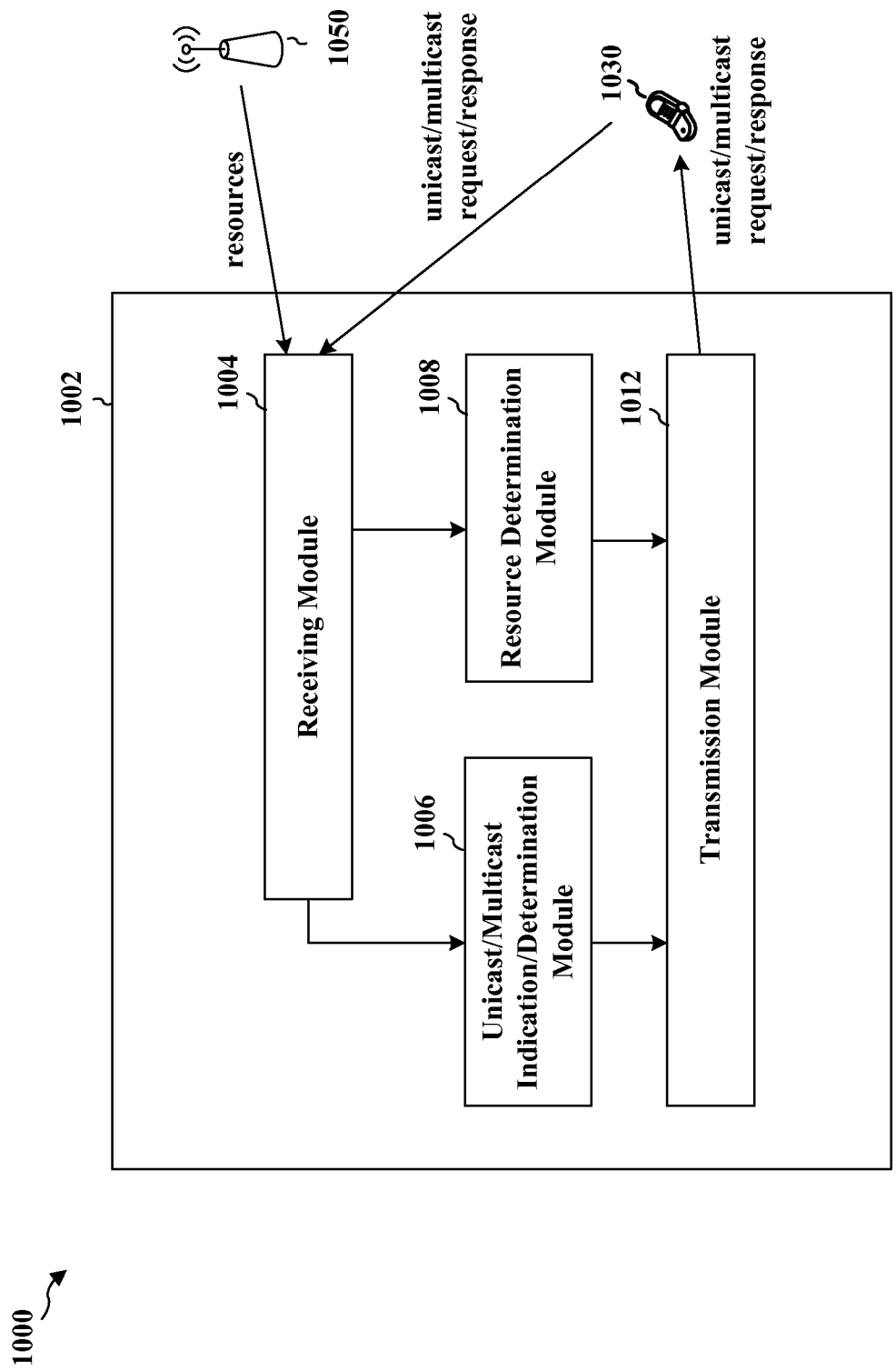
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. In one configuration, the apparatus includes a transmission module 1012 that is configured to send a transmission to the UE 1030 requesting a peer discovery signal and indicating whether the transmission includes a unicast request or a multicast request. The apparatus further includes a receiving module 1004 that is configured to receive at least one peer discovery signal response from the UE 1030 based on the transmission. The apparatus may further include a unicast/multicast indication/determination module 1006 that is configured to select a first pilot sequence when the transmission is a unicast request. The transmission module 1012 may be configured to include the selected first pilot sequence when the transmission is a unicast request. The unicast/multicast indication/determination module 1006 may be further configured to select a second pilot sequence when the transmission is a multicast request. The second pilot sequence is different than the first pilot sequence. The transmission module 1012 may be configured to include the selected second pilot sequence when the transmission is a multicast request. The unicast/multicast indication/determination module 1006 may be configured to select one or more pilot sequences from a first subset of pilot sequences of a set of orthogonal pilot sequences when the transmission is a unicast request. The transmission module 1012 may be configured to include the selected one or more pilot sequences from the first subset of pilot sequences when the transmission is a unicast request. The unicast/multicast indication/determination module 1006 may be configured to select one or more pilot sequences from a second subset of pilot sequences of the set of orthogonal pilot sequences when the transmission is a multicast request. The second subset of pilot sequences is different than the first subset of pilot sequences. The transmission module 1012 may be configured to include the selected one or more pilot sequences from the second subset of pilot sequences when the transmission is a multicast request. The receiving module 1004 may be configured to receive the at least one peer discovery signal response concurrently with one or more pilot sequences from the second subset of pilot sequences. The apparatus may further include a resource determination module 1008 that is configured to determine a set of resources for sending requests for peer discovery signals and receiving peer discovery signal responses. The transmission module 1012 may be configured to send the transmission in a first time slot of the set of resources and the receiving module 1004 may be configured to receive the at least one peer discovery signal response in a second time slot of the set of resources. The second time slot is a next available time slot after the first time slot for sending requests for peer discovery signals and receiving peer discovery signal responses. The resource determination module 1008 may be configured to determine a subset of resources of the set of resources in the second time slot for receiving the at least one peer discovery signal response when the transmission is a unicast request. The subset of resources is determined based on a mapping known a priori from resources utilized for sending the transmission. The at least one peer discovery signal response is received in the determined subset of resources when the transmission is a unicast request. The receiving module 1004 may be configured to listen for transmissions in a third time slot of the set of resources. The third time slot is a time slot previously available to the first time slot that is available for sending requests for peer discovery signals and receiving peer discovery signal responses. The unicast/multicast indication/determination module 1006 may be configured to determine transmissions received in the third time slot that are unicast requests. The unicast/multicast indication/determination module 1006 may be configured to determine a subset of resources in the third time slot corresponding to the determined transmissions that are utilized for unicast requests. The resource determination module 1008 may be configured to determine a second subset of resources in the first time slot based on mappings known a priori from the subset of resources in the third time slot to the second subset of resources in the first time slot. The resource determination module 1008 may be configured to determine a third subset of resources in the first time slot of the set of resources that exclude all resources in the second subset of resources. The resource determination module 1008 may be configured to select randomly a fourth subset of resources from the third subset of resources for sending the transmission. The transmission module 1012 may be configured to send the transmission in the selected fourth subset of resources. The resource determination module 1008 may be configured to select randomly a subset of resources of the set of resources in the first time slot for sending the transmission. The transmission is sent in the selected subset of resources. The receiving module 1004 may be configured to receive information from a base station 1050 indicating the set of resources. The transmission module 1012 may be configured to send information to the base station 1050 indicating at least one of an average number of resources in the set of resources with transmissions, an average number of resources in the set of resources utilized for unicast requests, or an average number of resources in the set of resources utilized for responses to multicast requests. The received information is based on the information sent to the base station 1050.

In one configuration, the apparatus includes a receiving module 1004 that is configured to receive a transmission from the UE 1030 requesting a peer discovery signal and indicating whether the transmission includes a unicast request or a multicast request. The apparatus further includes a transmission module 1012 that is configured to send a peer discovery signal response to the UE 1030 in response to the received transmission and on resources determined based on the indication whether the transmission includes a unicast request or a multicast request. The transmission may include a first pilot sequence when the transmission is a unicast request, and a second pilot sequence when the transmission is a multicast request. The second pilot sequence is different than the first pilot sequence. The apparatus may further include a unicast/multicast indication/determination module 1006 that is configured to determine whether the received transmission is a unicast request or a multicast request based on whether the transmission includes the first pilot sequence or the second pilot sequence. The transmission includes one or more pilot sequences from a first subset of pilot sequences of a set of orthogonal pilot sequences when the transmission is a unicast request, and one or more pilot sequences from a second subset of pilot sequences of the set of orthogonal pilot sequences when the transmission is a multicast request. The second subset of pilot sequences is different than the first subset of pilot sequences. The unicast/multicast indication/determination module 1006 may be configured to determine whether the received transmission is a unicast request or a multicast request based on whether the transmission includes one or more pilot sequences from the first subset of pilot sequences or the second subset of pilot sequences. The transmission module 1012 may be configured to send the peer discovery signal response concurrently with one or more pilot sequences from the second subset of pilot sequences. The apparatus may further include a resource determination module 1008 that is configured to determine a set of resources for receiving requests for peer discovery signals and sending peer discovery signal responses. The receiving module 1004 may be configured to receive the transmission in a first time slot of the set of resources and the transmission module 1012 may be configured to send the peer discovery signal response in a second time slot of the set of resources. The second time slot is a next available time slot after the first time slot for receiving requests for peer discovery signals and sending peer discovery signal responses. The transmission may be received in a first subset of resources of the set of resources in the first time slot. The unicast/multicast indication/determination module 1006 may be configured to determine whether the received transmission indicates the transmission is a unicast request or a multicast request based on the indication in the received transmission. The resource determination module 1008 may be configured to determine a second subset of resources of the set of resources in the second time slot for sending the peer discovery signal response when the received transmission is a unicast request. The transmission module 1012 may be configured to send the peer discovery signal response in the determined second subset of resources when the transmission is a unicast request. The second subset of resources is determined based on a mapping known a priori from the first subset of resources to the second subset of resources. The receiving module 1004 may be configured to listen for transmissions in the first time slot of the set of resources. The resource determination module 1008 may be configured to determine transmissions received in the first time slot that are unicast requests, and to determine a subset of resources in the first time slot corresponding to the determined transmissions that are utilized for unicast requests. The resource determination module 1008 may be configured to determine a second subset of resources in the second time slot based on mappings known a priori from the subset of resources in the first time slot to the second subset of resources in the second time slot, to determine a third subset of resources in the second time slot of the set of resources that exclude all resources in the second subset of resources, and to select randomly a fourth subset of resources from the third subset of resources for sending the peer discovery signal response when the transmission is a multicast request. The transmission module 1012 may be configured to send the transmission in the selected fourth subset of resources when the transmission is a multicast request. The resource determination module 1008 may be configured to select randomly a subset of resources of the set of resources in the second time slot for sending the peer discovery signal response when the transmission is a multicast request. The transmission module 1012 may be configured to send the peer discovery signal response in the selected subset of resources when the transmission is a multicast request. The receiving module 1004 may be configured to receive information from a base station 1050 indicating the set of resources. The transmission module 1012 may be configured to send information to the base station indicating at least one of an average number of resources in the set of resources with transmissions, an average number of resources in the set of resources utilized for unicast requests, or an average number of resources in the set of resources utilized for responses to multicast requests. The received information is based on the information sent to the base station.

The apparatus may include additional modules that perform each of the steps of the algorithm in the aforementioned flow charts of FIGS. 6-9. As such, each step in the aforementioned flow charts of FIGS. 6-9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
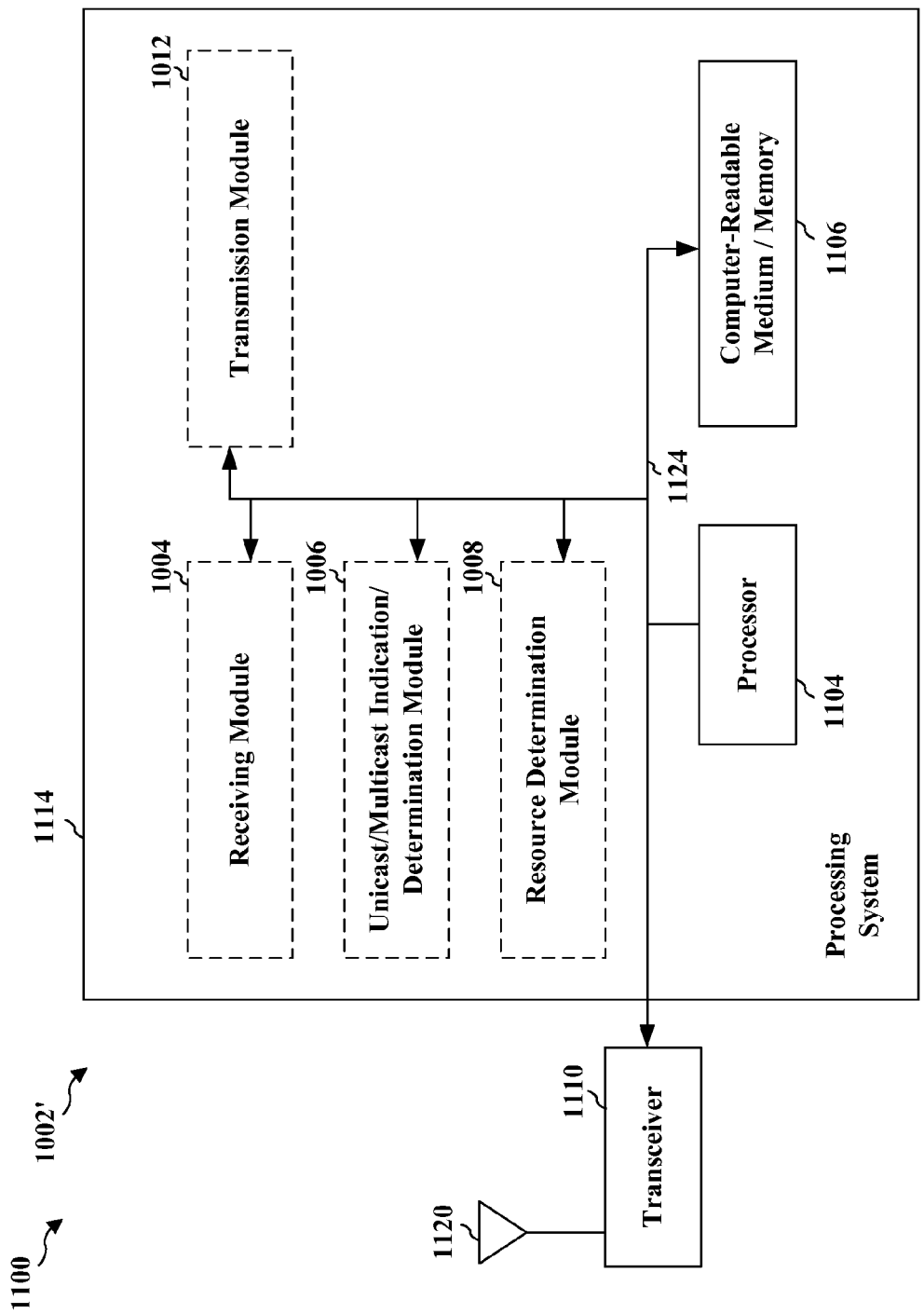
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1012, and the computer-readable medium/memory 1106. The bus 1124 may also link various other circuits such as timing sources, peripherals, voltage regulators, and power management circuits, which are well known in the art, and therefore, will not be described any further. The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114. In addition, the transceiver 1110 receives information from the processing system 1114, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008, 1012. The modules may be software modules running in the processor 1104, resident/stored in the computer readable medium/memory 1106, one or more hardware modules coupled to the processor 1104, or some combination thereof.

In one configuration, the apparatus 1002/1002' for wireless communication includes means for sending a transmission requesting a peer discovery signal and indicating whether the transmission includes a unicast request or a multicast request, and means for receiving at least one peer discovery signal response based on the transmission. The apparatus may further include means for selecting a first pilot sequence when the transmission is a unicast request. The transmission includes the selected first pilot sequence when the transmission is a unicast request. The apparatus may further include means for selecting a second pilot sequence when the transmission is a multicast request. The second pilot sequence is different than the first pilot sequence. The transmission includes the selected second pilot sequence when the transmission is a multicast request. The apparatus may further include means for selecting one or more pilot sequences from a first subset of pilot sequences of a set of orthogonal pilot sequences when the transmission is a unicast request. The transmission includes the selected one or more pilot sequences from the first subset of pilot sequences when the transmission is a unicast request. The apparatus may further include means for selecting one or more pilot sequences from a second subset of pilot sequences of the set of orthogonal pilot sequences when the transmission is a multicast request. The second subset of pilot sequences is different than the first subset of pilot sequences. The transmission includes the selected one or more pilot sequences from the second subset of pilot sequences when the transmission is a multicast request. The apparatus may further include means for determining a set of resources for sending requests for peer discovery signals and receiving peer discovery signal responses. The transmission is sent in a first time slot of the set of resources and the at least one peer discovery signal response is received in a second time slot of the set of resources. The second time slot is a next available time slot after the first time slot for sending requests for peer discovery signals and receiving peer discovery signal responses. The apparatus may further include means for determining a subset of resources of the set of resources in the second time slot for receiving the at least one peer discovery signal response when the transmission is a unicast request. The subset of resources is determined based on a mapping known a priori from resources utilized for sending the transmission. The at least one peer discovery signal response is received in the determined subset of resources when the transmission is a unicast request. The apparatus may further include means for listening for transmissions in a third time slot of the set of resources. The third time slot is a time slot previously available to the first time slot that is available for sending requests for peer discovery signals and receiving peer discovery signal responses. The apparatus may further include means for determining transmissions received in the third time slot that are unicast requests, and means for determining a subset of resources in the third time slot corresponding to the determined transmissions that are utilized for unicast requests. The apparatus may further include means for determining a second subset of resources in the first time slot based on mappings known a priori from the subset of resources in the third time slot to the second subset of resources in the first time slot. The apparatus may further include means for determining a third subset of resources in the first time slot of the set of resources that exclude all resources in the second subset of resources. The apparatus may further include means for selecting randomly a fourth subset of resources from the third subset of resources for sending the transmission, the transmission being sent in the selected fourth subset of resources. The apparatus may further include means for selecting randomly a subset of resources of the set of resources in the first time slot for sending the transmission. The transmission is sent in the selected subset of resources. The apparatus may further include means for receiving information from a base station indicating the set of resources. The apparatus further includes means for sending information to the base station indicating at least one of an average number of resources in the set of resources with transmissions, an average number of resources in the set of resources utilized for unicast requests, or an average number of resources in the set of resources utilized for responses to multicast requests. The received information is based on the information sent to the base station. The aforementioned means may be one or more of the aforementioned modules of the apparatus 1002 and/or the processing system 1114 of the apparatus 1002' configured to perform the functions recited by the aforementioned means.

In one configuration, the apparatus 1002/1002' for wireless communication includes means for receiving a transmission requesting a peer discovery signal and indicating whether the transmission includes a unicast request or a multicast request, and means for sending a peer discovery signal response in response to the received transmission and on resources determined based on the indication whether the transmission includes a unicast request or a multicast request. The transmission may include a first pilot sequence when the transmission is a unicast request, and a second pilot sequence when the transmission is a multicast request. The second pilot sequence is different than the first pilot sequence. The apparatus may further include means for determining whether the received transmission is a unicast request or a multicast request based on whether the transmission includes the first pilot sequence or the second pilot sequence. The transmission may include one or more pilot sequences from a first subset of pilot sequences of a set of orthogonal pilot sequences when the transmission is a unicast request, and one or more pilot sequences from a second subset of pilot sequences of the set of orthogonal pilot sequences when the transmission is a multicast request. The second subset of pilot sequences is different than the first subset of pilot sequences. The apparatus may further include means for determining whether the received transmission is a unicast request or a multicast request based on whether the transmission includes one or more pilot sequences from the first subset of pilot sequences or the second subset of pilot sequences. The apparatus may further include means for determining a set of resources for receiving requests for peer discovery signals and sending peer discovery signal responses. The transmission is received in a first time slot of the set of resources and the peer discovery signal response is sent in a second time slot of the set of resources. The second time slot is a next available time slot after the first time slot for receiving requests for peer discovery signals and sending peer discovery signal responses. The transmission may be received in a first subset of resources of the set of resources in the first time slot. The apparatus may further include means for determining whether the received transmission indicates the transmission is a unicast request or a multicast request based on the indication in the received transmission. The apparatus may further include means for determining a second subset of resources of the set of resources in the second time slot for sending the peer discovery signal response when the received transmission is a unicast request. The peer discovery signal response is sent in the determined second subset of resources when the transmission is a unicast request. The second subset of resources is determined based on a mapping known a priori from the first subset of resources to the second subset of resources. The apparatus may further include means for listening for transmissions in the first time slot of the set of resources, means for determining transmissions received in the first time slot that are unicast requests, and means for determining a subset of resources in the first time slot corresponding to the determined transmissions that are utilized for unicast requests. The apparatus may further include means for determining a second subset of resources in the second time slot based on mappings known a priori from the subset of resources in the first time slot to the second subset of resources in the second time slot, means for determining a third subset of resources in the second time slot of the set of resources that exclude all resources in the second subset of resources, and means for selecting randomly a fourth subset of resources from the third subset of resources for sending the peer discovery signal response when the transmission is a multicast request. The transmission is sent in the selected fourth subset of resources when the transmission is a multicast request. The apparatus may further include means for selecting randomly a subset of resources of the set of resources in the second time slot for sending the peer discovery signal response when the transmission is a multicast request. The peer discovery signal response is sent in the selected subset of resources when the transmission is a multicast request. The apparatus may further include means for receiving information from a base station indicating the set of resources. The apparatus may further include means for sending information to the base station indicating at least one of an average number of resources in the set of resources with transmissions, an average number of resources in the set of resources utilized for unicast requests, or an average number of resources in the set of resources utilized for responses to multicast requests. The received information is based on the information sent to the base station. The aforementioned means may be one or more of the aforementioned modules of the apparatus 1002 and/or the processing system 1114 of the apparatus 1002' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining, at a user equipment (UE) a set of resources for sending requests for peer discovery signals and receiving peer discovery signal responses;
   sending a transmission, from the UE, in a first time slot of the set of resources requesting a peer discovery signal, wherein the UE indicates whether the transmission is a unicast request or a multicast request by selecting and including a first pilot sequence in the transmission when the transmission is a unicast request and a second pilot sequence in the transmission when the transmission is a multicast request, wherein the first pilot sequence is different from the second pilot sequence, and wherein the first pilot sequence is selected from a first subset of pilot sequences of a set of orthogonal pilot sequences and the second pilot sequence is selected from a second subset of pilot of sequences of the set of orthogonal pilot sequences; and
   receiving, at the UE, at least one peer discovery signal response in a second time slot of the set of resources based on the transmission, the second time slot being a next available time slot after the first time slot for sending requests for peer discovery signals and receiving peer discovery signal responses.

2. The method of claim 1, further comprising determining a subset of resources of the set of resources in the second time slot for receiving the at least one peer discovery signal response when the transmission is a unicast request, the subset of resources being determined based on a mapping known a priori from resources utilized for sending the transmission, the at least one peer discovery signal response being received in the determined subset of resources when the transmission is a unicast request.

3. The method of claim 1, further comprising:
   listening for transmissions in a third time slot of the set of resources, the third time slot being a time slot previously available to the first time slot that is available for sending requests for peer discovery signals and receiving peer discovery signal responses;
   determining transmissions received in the third time slot that are unicast requests; and
   determining a subset of resources in the third time slot corresponding to the determined transmissions that are utilized for unicast requests.

4. The method of claim 3, further comprising:
   determining a second subset of resources in the first time slot based on mappings known a priori from the subset of resources in the third time slot to the second subset of resources in the first time slot;
   determining a third subset of resources in the first time slot of the set of resources that exclude all resources in the second subset of resources; and
   selecting randomly a fourth subset of resources from the third subset of resources for sending the transmission, the transmission being sent in the selected fourth subset of resources.

5. The method of claim 1, further comprising selecting randomly a subset of resources of the set of resources in the first time slot for sending the transmission, the transmission being sent in the selected subset of resources.

6. The method of claim 1, further comprising receiving information from a base station indicating the set of resources.

7. The method of claim 6, further comprising sending information to the base station indicating at least one of an average number of resources in the set of resources with transmissions, an average number of resources in the set of resources utilized for unicast requests, or an average number of resources in the set of resources utilized for responses to multicast requests, wherein the received information is based on the information sent to the base station.

8. A method of wireless communication, comprising:
   determining, at a user equipment (UE) a set of resources for sending requests for peer discovery signals and receiving peer discovery signal responses;
   receiving a transmission, at the UE, in a first time slot of the set of resources requesting a peer discovery signal, wherein the received transmission includes an indication whether the transmission is a unicast request or a multicast request, wherein the transmission includes a first pilot sequence when the transmission is a unicast request and a second pilot sequence when the transmission is a multicast request, wherein the first pilot sequence is different from the second pilot sequence, and wherein the first pilot sequence is selected from a first subset of pilot sequences of a set of orthogonal pilot sequences and the second pilot sequence is selected from a second subset of pilot of sequences of the set of orthogonal pilot sequences; and
   sending, from the UE, a peer discovery signal response in a second time slot of the set of resources in response to the received transmission and on resources determined based on the indication, the second time slot being a next available time slot after the first time slot for sending requests for peer discovery signals and receiving peer discovery signal responses.

9. The method of claim 8, wherein the transmission is received in a first subset of resources of the set of resources in the first time slot, and the method further comprises:
 determining whether the received transmission indicates the transmission is a unicast request or a multicast request based on the indication in the received transmission; and
 determining a second subset of resources of the set of resources in the second time slot for sending the peer discovery signal response when the received transmission is a unicast request, the peer discovery signal response being sent in the determined second subset of resources when the transmission is a unicast request, the second subset of resources being determined based on a mapping known a priori from the first subset of resources to the second subset of resources.

10. The method of claim 8, further comprising:
 listening for transmissions in the first time slot of the set of resources;
 determining transmissions received in the first time slot that are unicast requests; and
 determining a subset of resources in the first time slot corresponding to the determined transmissions that are utilized for unicast requests.

11. The method of claim 10, further comprising:
 determining a second subset of resources in the second time slot based on mappings known a priori from the subset of resources in the first time slot to the second subset of resources in the second time slot;
 determining a third subset of resources in the second time slot of the set of resources that exclude all resources in the second subset of resources; and
 selecting randomly a fourth subset of resources from the third subset of resources for sending the peer discovery signal response when the transmission is a multicast request, the transmission being sent in the selected fourth subset of resources when the transmission is a multicast request.

12. The method of claim 8, further comprising selecting randomly a subset of resources of the set of resources in the second time slot for sending the peer discovery signal response when the transmission is a multicast request, the peer discovery signal response being sent in the selected subset of resources when the transmission is a multicast request.

13. The method of claim 8, further comprising receiving information from a base station indicating the set of resources.

14. The method of claim 13, further comprising sending information to the base station indicating at least one of an average number of resources in the set of resources with transmissions, an average number of resources in the set of resources utilized for unicast requests, or an average number of resources in the set of resources utilized for responses to multicast requests, wherein the received information is based on the information sent to the base station.

15. An apparatus for wireless communication, comprising:
 means for determining, at a user equipment (UE) a set of resources for sending requests for peer discovery signals and receiving peer discovery signal responses;
 means for receiving a transmission, at the UE, in a first time slot of the set of resources requesting a peer discovery signal, wherein the received transmission includes an indication whether the transmission is a unicast request or a multicast request, wherein the transmission includes a first pilot sequence when the transmission is a unicast request and a second pilot sequence when the transmission is a multicast request, wherein the first pilot sequence is different from the second pilot sequence, and wherein the first pilot sequence is selected from a first subset of pilot sequences of a set of orthogonal pilot sequences and the second pilot sequence is selected from a second subset of pilot of sequences of the set of orthogonal pilot sequences; and
 means for sending, from the UE, a peer discovery signal response in a second time slot of the set of resources in response to the received transmission and on resources determined based on the indication, the second time slot being a next available time slot after the first time slot for sending requests for peer discovery signals and receiving peer discovery signal responses.

16. The apparatus of claim 15, wherein the transmission is received in a first subset of resources of the set of resources in the first time slot, and the apparatus further comprises:
 means for determining whether the received transmission indicates the transmission is a unicast request or a multicast request based on the indication in the received transmission; and
 means for determining a second subset of resources of the set of resources in the second time slot for sending the peer discovery signal response when the received transmission is a unicast request, the peer discovery signal response being sent in the determined second subset of resources when the transmission is a unicast request, the second subset of resources being determined based on a mapping known a priori from the first subset of resources to the second subset of resources.

17. The apparatus of claim 15, further comprising:
 means for listening for transmissions in the first time slot of the set of resources;
 means for determining transmissions received in the first time slot that are unicast requests; and
 means for determining a subset of resources in the first time slot corresponding to the determined transmissions that are utilized for unicast requests.

18. The apparatus of claim 17, further comprising:
 means for determining a second subset of resources in the second time slot based on mappings known a priori from the subset of resources in the first time slot to the second subset of resources in the second time slot;
 means for determining a third subset of resources in the second time slot of the set of resources that exclude all resources in the second subset of resources; and
 means for selecting randomly a fourth subset of resources from the third subset of resources for sending the peer discovery signal response when the transmission is a multicast request, the transmission being sent in the selected fourth subset of resources when the transmission is a multicast request.

19. The apparatus of claim 15, further comprising means for selecting randomly a subset of resources of the set of resources in the second time slot for sending the peer discovery signal response when the transmission is a multicast request, the peer discovery signal response being sent in the selected subset of resources when the transmission is a multicast request.

20. The apparatus of claim 15, further comprising means for receiving information from a base station indicating the set of resources.

21. The apparatus of claim 20, further comprising means for sending information to the base station indicating at least one of an average number of resources in the set of resources with transmissions, an average number of resources in the set of resources utilized for unicast requests, or an average number of resources in the set of resources utilized for responses to multicast requests, wherein the received information is based on the information sent to the base station.

22. An apparatus for wireless communication, comprising:
  a memory; and
  at least one processor coupled to the memory and configured to:
  determine, at a user equipment (UE) a set of resources for sending requests for peer discovery signals and receiving peer discovery signal responses;
  receive a transmission, at the UE, in a first time slot of the set of resources requesting a peer discovery signal, wherein the received transmission includes an indication whether the transmission is a unicast request or a multicast request, wherein the transmission includes a first pilot sequence when the transmission is a unicast request and a second pilot sequence when the transmission is a multicast request, wherein the first pilot sequence is different from the second pilot sequence, and wherein the first pilot sequence is selected from a first subset of pilot sequences of a set of orthogonal pilot sequences and the second pilot sequence is selected from a second subset of pilot of sequences of the set of orthogonal pilot sequences; and
  send, from the UE, a peer discovery signal response in a second time slot of the set of resources in response to the received transmission and on resources determined based on the indication, the second time slot being a next available time slot after the first time slot for sending requests for peer discovery signals and receiving peer discovery signal responses.

23. A non-transitory computer-readable medium storing computer executable code for wireless communication, comprising:
  code for determining, at a user equipment (UE) a set of resources for sending requests for peer discovery signals and receiving peer discovery signal responses;
  code for receiving a transmission, at the UE, in a first time slot of the set of resources requesting a peer discovery signal, wherein the received transmission includes an indication whether the transmission is a unicast request or a multicast request, wherein the transmission includes a first pilot sequence when the transmission is a unicast request and a second pilot sequence when the transmission is a multicast request, wherein the first pilot sequence is different from the second pilot sequence, and wherein the first pilot sequence is selected from a first subset of pilot sequences of a set of orthogonal pilot sequences and the second pilot sequence is selected from a second subset of pilot of sequences of the set of orthogonal pilot sequences; and
  code for sending a peer discovery signal response from the UE in a second time slot of the set of resources in response to the received transmission and on resources determined based on the indication, the second time slot being a next available time slot after the first time slot for sending requests for peer discovery signals and receiving peer discovery signal responses.

* * * * *